(12) United States Patent
Zhu et al.

(10) Patent No.: US 9,378,385 B1
(45) Date of Patent: Jun. 28, 2016

(54) SYSTEMS AND METHODS FOR DETERMINING WHETHER TRANSMISSION OF SENSITIVE DATA IS EXPECTED

(71) Applicant: Symantec Corporation, Mountain View, CA (US)

(72) Inventors: Xiaole Zhu, Culver City, CA (US); Matthew Yeo, San Francisco, CA (US); Abubakar A. Wawda, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/283,824

(22) Filed: May 21, 2014

(51) Int. Cl.
*G06F 21/00* (2013.01)
*G06F 21/60* (2013.01)

(52) U.S. Cl.
CPC ................................ *G06F 21/606* (2013.01)

(58) Field of Classification Search
USPC ............................................................. 726/1
See application file for complete search history.

(56) References Cited

U.S. PATENT DOCUMENTS

| | | | |
|---|---|---|---|
| 8,869,286 B1 * | 10/2014 | Liu ....................... | G06F 21/577 726/25 |
| 2006/0168213 A1 * | 7/2006 | Richardson et al. .......... | 709/225 |
| 2006/0230439 A1 * | 10/2006 | Smith et al. ....................... | 726/9 |
| 2009/0249492 A1 * | 10/2009 | Boesgaard Sorensen ...... | 726/27 |
| 2010/0192220 A1 * | 7/2010 | Heizmann ........... | G06F 11/3664 726/19 |
| 2011/0231936 A1 | 9/2011 | Williams et al. | |
| 2014/0205099 A1 * | 7/2014 | Christodorescu et al. .... | 380/278 |

OTHER PUBLICATIONS

Bruce McCorkendale, et al; Systems and Methods for Combining Static and Dynamic Code Analysis; U.S. Appl. No. 13/434,416, filed Mar. 29, 2012.
"DexGuard", http://www.saikoa.com/dexguard, as accessed Mar. 25, 2014, (May 31, 2012).
Constantin, Lucian "New Android Trojan app exploits previously unknown flaws, researchers say", http://www.computerworld.com/s/article/9239913/New_Android_Trojan_app_exploits_previously_unknown_flaws_researchers_say?taxonomyId=17, as accessed Mar. 25, 2014, Computerworld Inc., (Jun. 7, 2013).
Bruce McCorkendale, et al; Systems and Methods for Combining Static and Dynamic Code Analysis; U.S. Appl. No. 14/231,663, filed Mar. 31, 2014.
Jinghao Li, et al.; Systems and Methods for Classifying Permissions on Mobile Devices; U.S. Appl. No. 14/938,874, filed Nov. 12, 2015.

* cited by examiner

*Primary Examiner* — Jason Lee
(74) *Attorney, Agent, or Firm* — ALG Intellectual Property, LLC (57) ABSTRACT

The disclosed computer-implemented method for determining whether transmission of sensitive data is expected may include (1) identifying a computer program that is to be analyzed to determine whether the computer program unexpectedly transmits sensitive data, (2) simulating user input to the computer program while the computer program is executing, (3) identifying a context of the simulated user input, (4) identifying transmission of sensitive data that occurs after the user input is simulated, (5) determining, based on the context of the simulated user input, whether the transmission of sensitive data would be an expected result of the user input, and (6) performing a security action with respect to the computer program based on whether the transmission of sensitive data is expected. Various other methods, systems, and computer-readable media are also disclosed.

20 Claims, 6 Drawing Sheets

SYSTEMS AND METHODS FOR DETERMINING WHETHER TRANSMISSION OF SENSITIVE DATA IS EXPECTED

BACKGROUND

One of the challenges associated with protecting sensitive data is differentiating between data that is transmitted as a normal and expected part of user activities and data that is transmitted without the knowledge of the user. Some of the factors that have increased the magnitude of this challenge include cloud computing and social networking. Sensitive data may often be transmitted between clients and servers in cloud computing environments. In addition, significant amounts of personal information and other sensitive data may be transmitted from social networking clients on user's devices to social networking systems.

To a certain extent, transmission of sensitive data takes place with the knowledge and approval of users. A user may know that the address book on their mobile phone is being backed up to a cloud database because they authorized the backup. They may also be aware that the social networking program on their smartphone may transmit their current location when they update their status. All of this expected transmission of sensitive data makes it that much more difficult to determine when sensitive data is being transmitted unexpectedly. Accordingly, the instant disclosure identifies and addresses a need for additional and improved systems and methods for determining whether transmission of sensitive data is expected.

SUMMARY

As will be described in greater detail below, the instant disclosure describes various systems and methods for determining whether transmission of sensitive data is expected. Systems and methods described herein may determine whether data transmitted by a computer program is consistent with expectations set by the program's user interface by simulating user input to the computer program, detecting what data is transmitted in response to the user input, then determining whether the data transmitted is consistent with expectations set by the program's user interface.

In one example, a computer-implemented method for determining whether transmission of sensitive data is expected may include (1) identifying a computer program that is to be analyzed to determine whether the computer program unexpectedly transmits sensitive data, (2) simulating user input to the computer program while the computer program is executing, (3) identifying a context of the simulated user input, (4) identifying transmission of sensitive data that occurs after the user input is simulated, (5) determining, based on the context of the simulated user input, whether the transmission of sensitive data is an expected result of the user input, and (6) performing a security action with respect to the computer program based on whether the transmission of sensitive data is expected.

In some examples, simulating user input to the computer program may include: (1) identifying one or more user interface elements of the computer program, (2) identifying a user input action appropriate for the user interface element, (3) identifying an event that results from the user input action in the computing platform on which the computer program is executing, and (4) initiating the event in the computing platform directed toward the user interface element of the computer program. In some examples, identifying the context of the simulated user input may include identifying information associated with the user interface element that indicates a purpose for the user interface element, where the information may include one or more of (1) a label on the user interface element, (2) a label proximate to the user interface element, (3) a label on a user interface element group that includes the user interface element, (4) a label on a window displayed by the computer program, (5) help text associated with the user interface element, and/or (6) at least one additional user interface element displayed by the computer program after user input to the user interface element is simulated.

In one embodiment, determining, based on the context of the simulated user input, whether the transmission of sensitive data is an expected result of the user input may include (1) determining an expected transmission associated with the purpose for the user interface element and (2) determining whether the transmission of sensitive data includes the expected transmission. In some examples, identifying transmission of sensitive data that occurs after the user input is simulated may include (1) identifying an input latency period that represents a maximum expected time between the user input and an associated data transmission and (2) determining whether the transmission of sensitive data occurs within the input latency period, where the determination of whether the transmission of sensitive data would be an expected result of the user input is based on whether the transmission of sensitive data occurs within the input latency period.

In some examples, the computer-implemented method may further include identifying transmission of sensitive data that occurs before the user input is simulated by (1) identifying a program initiation period that represents a maximum expected time for the computer program to perform initiation functions after the computer program begins executing, (2) executing the computer program, and (3) identifying the transmission of sensitive data within the program initiation period. In such examples, the security action may be further based on identifying the transmission of sensitive data within the program initiation period. In one embodiment, the security action may include (1) formulating a rule associating the user input with the transmission of sensitive data, (2) providing a warning message stating that the computer program transmits sensitive data that is not the expected result of user input, and/or (3) identifying the computer program as malware. In some examples, the computer-implemented method may further include providing the rule to a data loss prevention client.

In one embodiment, a system for implementing the above-described method may include several modules stored in memory, such as (1) a program identification module that (a) identifies a computer program that is to be analyzed to determine whether the computer program unexpectedly transmits sensitive data and (b) identifies a context of simulated user input, (2) a simulation module that simulates user input to the computer program while the computer program is executing, (3) a transmission identification module that identifies transmission of sensitive data that occurs after the user input is simulated, (4) a context module that determines, based on the context of the simulated user input, whether the transmission of sensitive data is an expected result of the user input, and (5) a security module that performs a security action with respect to the computer program based on whether the transmission of sensitive data is expected. The system may also include at least one physical processor configured to execute the program identification module, the simulation module, the transmission identification module, the context module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a computer program that is to be analyzed to determine whether the computer program unexpectedly transmits sensitive data, (2) simulate user input to the computer program while the computer program is executing, (3) identify a context of the simulated user input, (4) identify transmission of sensitive data that occurs after the user input is simulated, (5) determine, based on the context of the simulated user input, whether the transmission of sensitive data is an expected result of the user input, and (6) perform a security action with respect to the computer program based on whether the transmission of sensitive data is expected.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining whether transmission of sensitive data is expected. As will be explained in greater detail below, the systems and methods described herein may analyze the context of various elements of a computer program's user interface and determine whether certain data is expected to be transmitted. The data actually transmitted may then be compared to expectations set by the program's user interface to determine whether the program uses sensitive data in a manner consistent with expectations set by the program's user interface. When systems and methods described herein detect unexpected data transmissions, appropriate actions (such as warning users of the computer program or identifying the computer program as malware) may be initiated.

Figure 1:
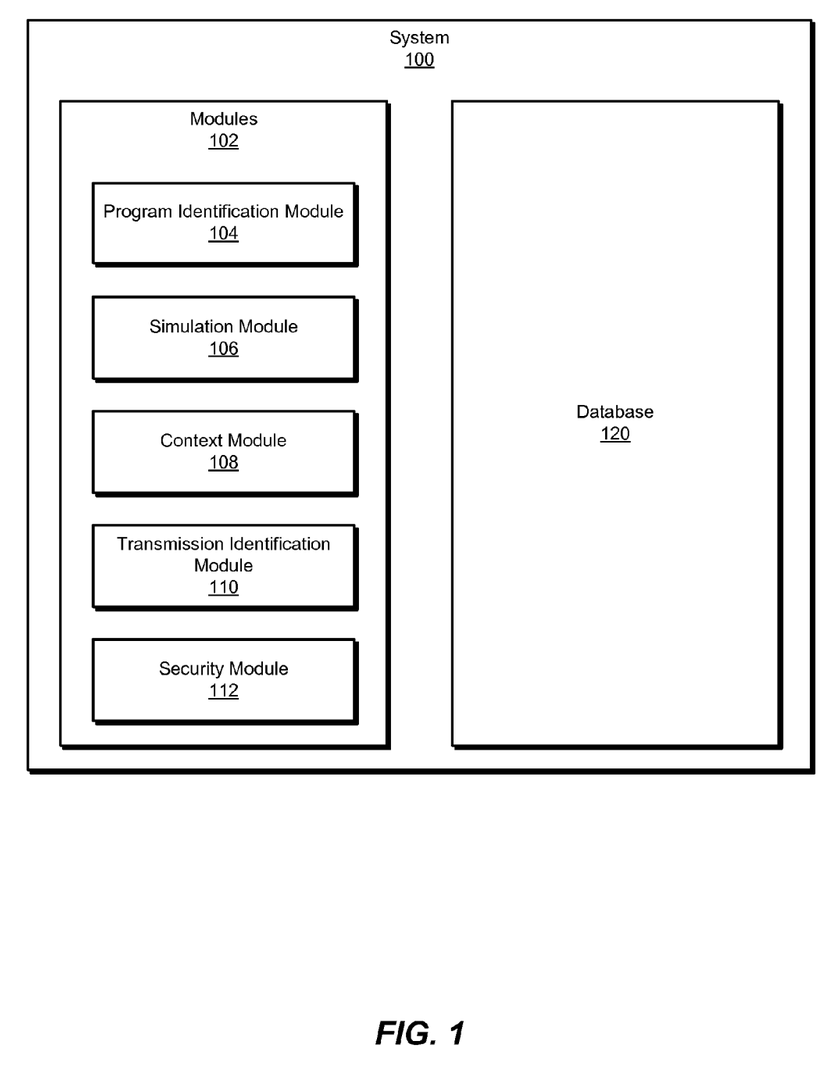
FIG. 1 is a block diagram of an exemplary system for determining whether transmission of sensitive data is expected.
Figure 2:
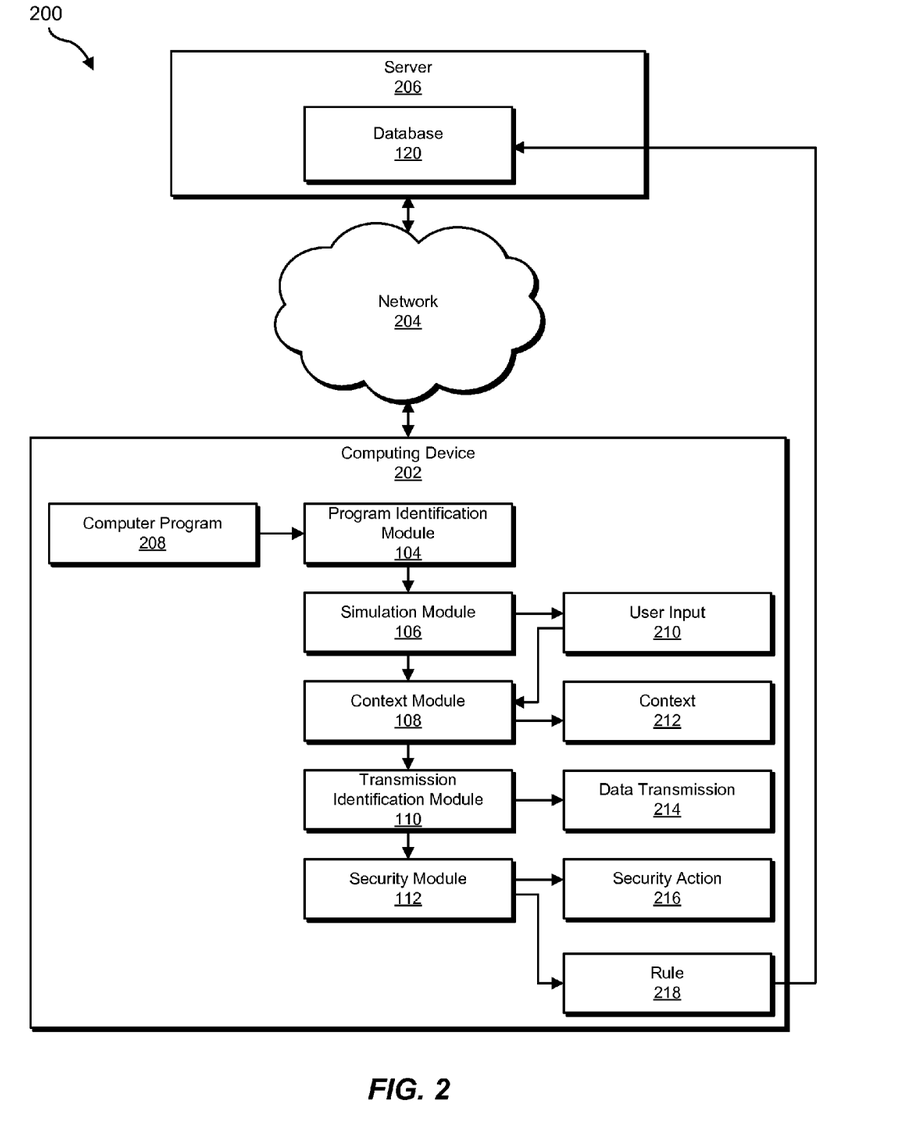
FIG. 2 is a block diagram of an additional exemplary system for determining whether transmission of sensitive data is expected.

The following will provide, with reference to FIGS. 1-2, detailed descriptions of exemplary systems for determining whether transmission of sensitive data is expected. Detailed descriptions of corresponding computer-implemented methods will also be provided in connection with FIG. 3. Detailed descriptions of an exemplary graphical user interface will provide in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for determining whether transmission of sensitive data is expected. As illustrated in this figure, exemplary system 100 may include one or more modules 102 for performing one or more tasks. For example, and as will be explained in greater detail below, exemplary system 100 may include a program identification module 104 that may identify a computer program that is to be analyzed to determine whether the computer program unexpectedly transmits sensitive data. Exemplary system 100 may additionally include a simulation module 106 that may simulate user input to the computer program while the computer program is executing. Exemplary system 100 may also include a context module 108 that may identify a context of the simulated user input.

Exemplary system 100 may additionally include a transmission identification module 110 that may identify transmission of sensitive data that occurs after the user input is simulated. Context module 108 may also determine, based on the context of the simulated user input, whether the transmission of sensitive data would be an expected result of the user input. Exemplary system 100 may also include a security module 112 that may perform a security action with respect to the computer program based on whether the transmission of sensitive data is expected. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store rules associating user input with the transmission of sensitive data. The rules stored in database 120 may, for example, be provided to a data loss prevention system. Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to determine whether transmission of sensitive data is expected. For example, and as will be described in greater detail below, program identification module 104 may identify a computer program 208 that is to be analyzed to determine whether computer program 208 unexpectedly transmits sensitive data. Simulation module 106 may simulate user input 210 to computer program 208 while computer program 208 is executing. Context module 108 may identify a context 212 of user input 210. Transmission identification module 110 may identify transmission of sensitive data 214 that occurs after user input 210 is simulated. Context module 108 may determine, based on context 212 of user input 210, whether the transmission of sensitive data 214 is an expected result of user input 210. Security module 112 may perform a security action 216 with respect to computer program 208 based on whether the transmission of sensitive data 214 is expected. Security action 216 may involve establishing a rule 218 that is formulated to associate user input 210 with data transmission 214. Security module 112 may store rule 218 in database 120 for use (for example) by a data loss prevention system.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of storing, comparing, and/or providing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
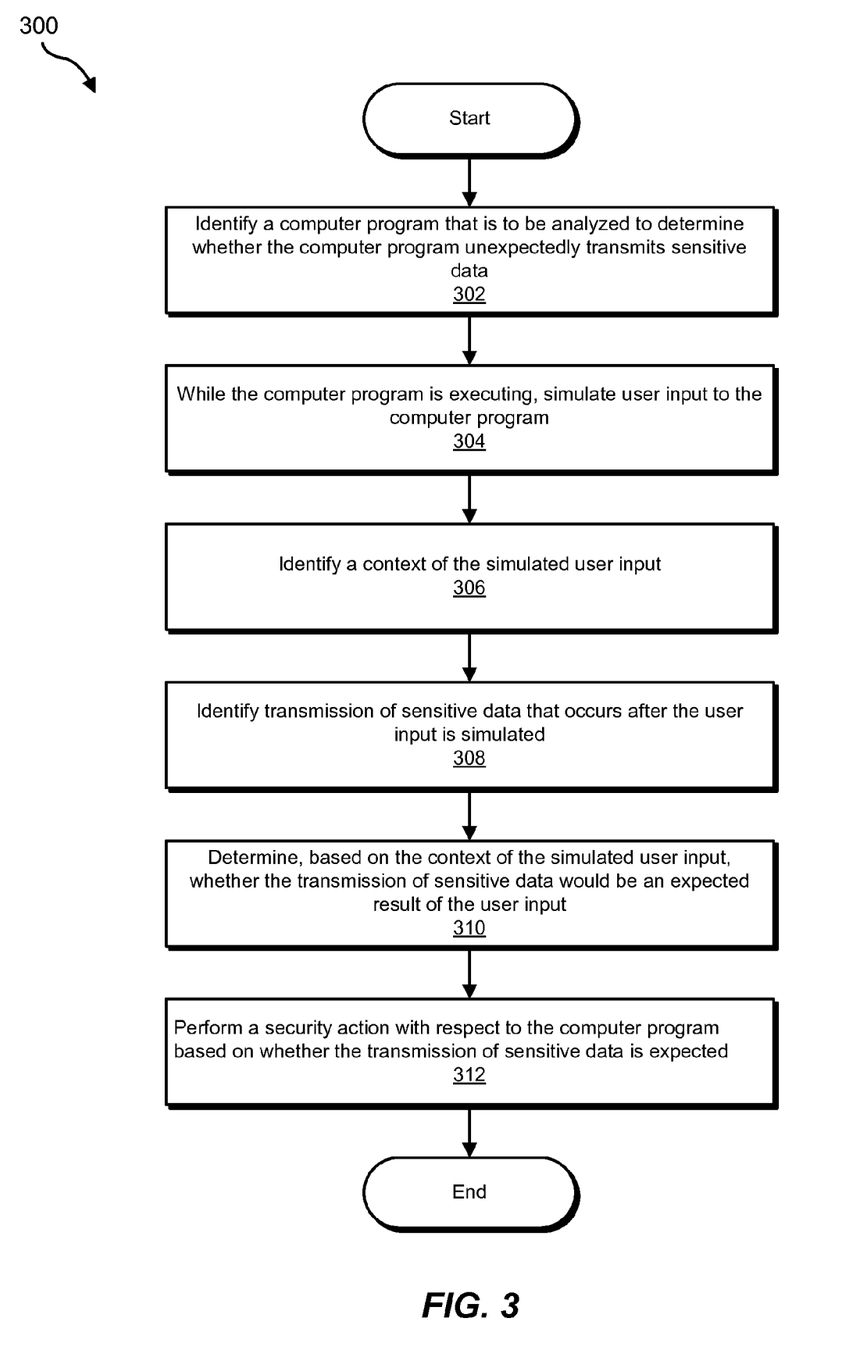
FIG. 3 is a flow diagram of an exemplary method for determining whether transmission of sensitive data is expected.

FIG. 3 is a flow diagram of an exemplary computer-implemented method 300 for determining whether transmission of sensitive data is expected. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a computer program that is to be analyzed to determine whether the computer program unexpectedly transmits sensitive data. For example, at step 302 program identification module 104 may, as part of computing device 202 in FIG. 2, identify computer program 208 that is to be analyzed to determine whether computer program 208 unexpectedly transmits sensitive data.

As used herein, the phrase "sensitive data" may refer to any data that a user and/or company would not want sent outside of a computing device or system without knowledge and/or permission of the user and/or company. Examples of sensitive information may include, without limitation, a name, a phone number, a device identifier, an email address, a contact, a browser history, a browser cookie, a phone history, a message history, location information (e.g., global positioning system information), financial information (e.g., credit card numbers, bank account numbers, etc.), confidential information, privileged information, personal information (e.g., a social security number, a driver's license number, etc.), sensitive corporate information (e.g., intellectual property, customer lists, product roadmaps, etc.), usage information, and/or any other type of sensitive data.

Program identification module 104 may identify the computer program to be analyzed in any suitable manner. For example, program identification module 104 may receive the computer program from a software developer or publisher for testing and/or certification that the computer program does not unexpectedly transmit sensitive data. In another example, program identification module 104 may receive the computer program from an anti-malware system as part of a testing process to determine whether the computer program may be considered to be malware. Likewise, program identification module 104 may receive the computer program from a data loss prevention system as part of a testing process to determine whether the computer program constitutes a data loss threat. In some examples, program identification module 104 may identify the computer program as it executes on a user's device.

At step 304 one or more of the systems described herein may simulate user input to the computer program while the computer program is executing. For example, at step 304 simulation module 106 may, as part of computing device 202 in FIG. 2, simulate user input 210 to computer program 208 while computer program 208 is executing.

Simulation module 106 may simulate user input to the computer program in a variety of ways. For example, simulation module 106 may execute the computer program on an emulated version of the computing platform on which the computer program is designed to run. For example, a program designed to run on the ANDROID operating system may run on an ANDROID emulator running on a MICROSOFT WINDOWS-based computing system. Using a computing platform emulator in this way may provide greater flexibility in the ways simulation module 106 may provide simulated user input to the computer program. For example, simulation module 106 may examine the computer program's user interface to devise a set of user inputs that test all user interface components.

In some examples, simulation module 106 may simulate user input to the computer program by: (1) identifying at least one user interface element of the computer program, (2) identifying a user input action appropriate for the user interface element, (3) identifying an event that results from the user input action in a computing platform on which the computer program is executing, and (4) initiating the event in the computing platform directed toward the user interface element of the computer program. For example, simulation module 106 may identify a button on a window displayed by the computer program. Simulation module 106 may determine that on the computing platform on which the computer program is running, a user clicking a button generates a click event that specifies the button control to which the click event is directed. Simulation module 106 may simulate a user clicking the button by directing the computing platform to generate a click event directed toward the button. Simulation module 106 may also simulate any other type of user input (e.g., keyboard input in a text field, voice control input received via a microphone, etc.).

Returning to FIG. 3, at step 306 one or more of the systems described herein may identify a context of the simulated user input. For example, at step 306 context module 108 may, as part of computing device 202 in FIG. 2, identify context 212 of simulated user input 210 in computer program 208. The term "context," as used herein, generally refers to the location of user interface elements within the computer program relative to other user interface elements, explanatory text, and other indicators of the intended purpose of the user input.

Context module 108 may identify the context of the simulated user input in a variety of ways. For example, context module 108 may identify the context of the simulated user input by identifying information associated with the user interface element that indicates a purpose for the user interface element, where the information may include at least one of (1) a label on the user interface element, (2) a label proximate to the user interface element, (3) a label on a user interface element group that includes the user interface element, (4) a label on a window displayed by the computer program (5) help text associated with the user interface element, and/or (6) at least one additional user interface element displayed by the computer program after user input to the user interface element is simulated.

Figure 4:
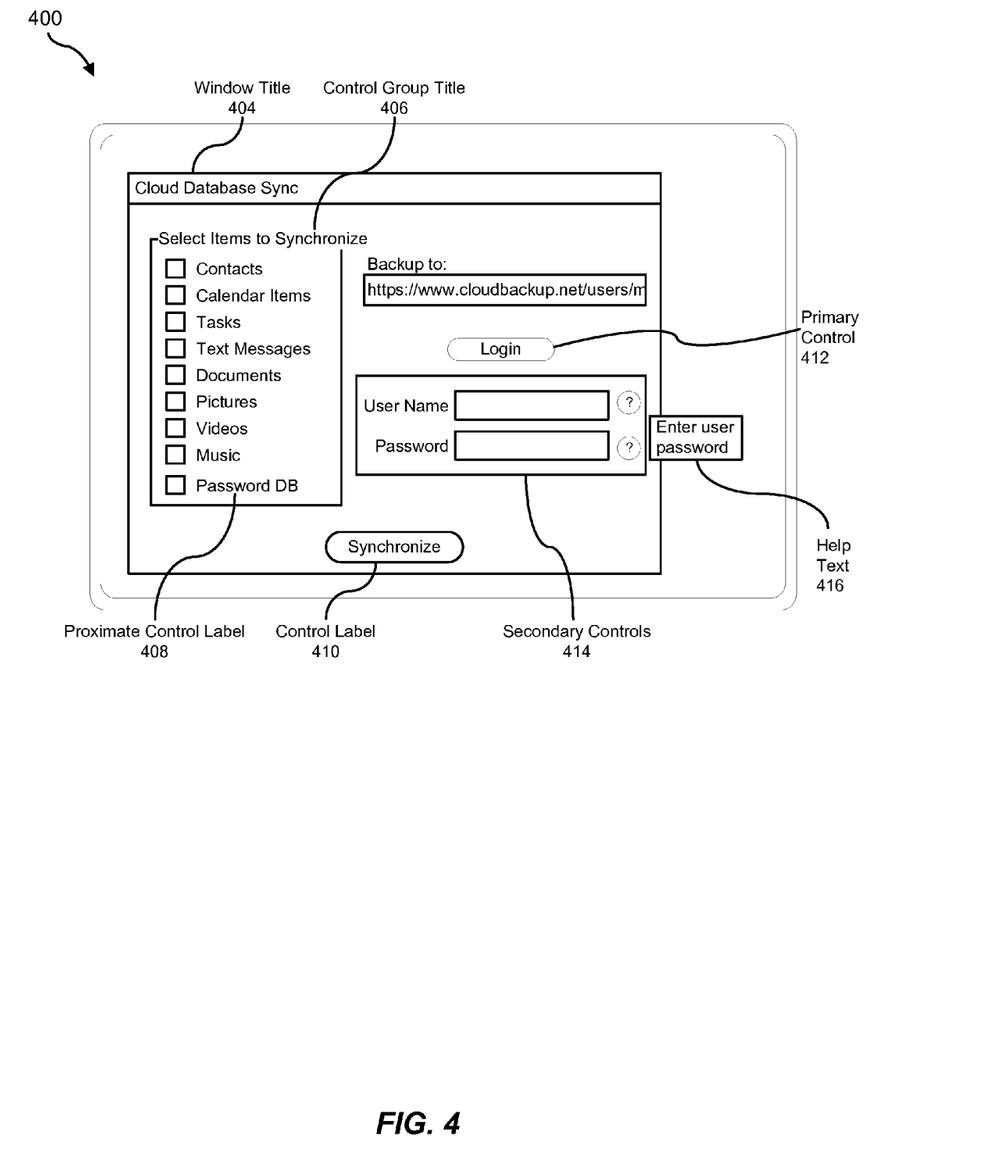
FIG. 4 is a block diagram of an exemplary graphical user interface displaying the context of user input.

FIG. 4 is a block diagram of an exemplary graphical user interface 400 displaying several examples of user interface elements that context module 108 may use to determine the context of specific elements within a user interface. User interface 400 includes a window title 404 that indicates a purpose for the window within the computer program or for the computer program as a whole. User interface 400 also includes control group title 406 that indicates the purpose for a related group of user interface elements—checkboxes in the example depicted. User interface 400 also includes proximate control label 408 that indicates the purpose for the checkbox element next to proximate control label 408. User interface 400 also include control label 410 that indicates the purpose for the button control on which control label 410 is located. As depicted in FIG. 4, user interface 400 also includes primary control 412 that, when activated, displays a set of secondary controls 414. The context of secondary controls (for example, titles, labels, and help text) may in turn provide context for primary control 412. User interface 400 also includes help text 416 that explains the purpose of a user interface element in secondary controls 414.

In exemplary graphical user interface 400, window title 404 indicates that the purpose of the computer program is to synchronize data on the computing device with a cloud database. The "Login" label on primary control 412 indicates that the purpose of the button on which the label is located is intended to log into the cloud database service. Secondary controls 414 and help text 416 indicate that when user input activates primary control 412, a user name and password may be transmitted to the cloud database service. In some examples, context module 108 may also use icons or other graphical elements, at least in part, to determine the context of a user interface element.

Returning to FIG. 3, at step 308 one or more of the systems described herein may identify transmission of sensitive data that occurs after the user input is simulated. For example, at step 308 transmission identification module 110 may, as part of computing device 202 in FIG. 2, identify data transmission 214 that includes sensitive data and that occurs after user input 210 is simulated in computer program 208. As used herein, the term "transmission" may refer to the communication of data to any location external to and/or apart from a computing device. For example, if data is exposed outside a computing device, the data may be transferred over a network (such as a wired, WiFi, or mobile phone network) to which the computing device is connected, the data may be transferred to a removable hard drive or non-volatile memory component (such as a flash memory card) attached to the computing device, the data may be displayed or otherwise provided on an input/output device connected to the computing device, and/or the data may be exposed in any other manner.

Transmission identification module 110 may identify transmission of sensitive data that occurs after user input is simulated in a variety of ways. For example, transmission identification module 110 may identify transmission of sensitive data that occurs after the user input is simulated by (1) identifying an input latency period that represents a maximum expected Time between the user input and an associated data transmission and (2) determining whether the transmission of sensitive data occurs within the input latency period, where the determination of whether the transmission of sensitive data would be an expected result of the user input is based on whether the transmission of sensitive data occurs within the input latency period.

The input latency period identified by transmission identification module 110 may be one aspect of associating a data transmission with user input. Depending on factors such as the computing platform on which the computer program is running, other processes running on the computing device, and the quantity of computation or data processing associated with the user input, the delay between user input and any associated data transmission may vary. Transmission identification module 110 may coordinate with simulation module 106 to determine the length of time between simulated user input and any associated data transmission. Transmission identification module 110 may determine the appropriate input latency period for the computer program using an initial estimate that considers the relevant factors and may then may adjusting the input latency period as testing of the computer program's user interface progresses. In other examples, a fixed or predetermined latency period may be used to determine whether a particular transmission is expected.

In some examples, the systems described herein may, in addition to or instead of identifying sensitive data transmitted after user input is simulated, identify transmission of sensitive data that occurs before any user input is simulated by (1) identifying a program initiation period that represents a maximum expected time for the computer program to perform initiation functions after the computer program begins executing, (2) executing the computer program, and (3) identifying the transmission of sensitive data within the program initiation period. In such examples, a security action may be based on identifying the transmission of sensitive data within the program initiation period.

A program initiation period for a computer program may involve a period of time when the program reads data from storage into memory, initialize data structures, establish network connections, etc. Sensitive data may be transmitted during this program initiation period. Transmission of sensitive data during the program initiation period may be expected and necessary to the computer program's intended function. However, sensitive data may also be transmitted unexpectedly during the program initiation period. As with the input latency period, the length of the program initiation period may vary depending upon many of the same factors (computing platform, other executing processes, computation intensity of the type of computer program executing). Transmission identification module 110 may use an estimate of the program initiation period based on those factors. In another example, transmission identification module 110 may monitor the process associated with the executing computer program to determine when the computer program has completed its initiation processes and is waiting for user input. At the end of the program initiation period, transmission identification module 110 may signal simulation module 106 that simulated user input may commence. Any data transmission detected after the program initiation period may then be associated with user input.

At step 310 of FIG. 3, one or more of the systems described herein may determine, based on the context of the simulated user input, whether the transmission of sensitive data would be an expected result of the user input. For example, at step 310 context module 108 may, as part of computing device 202 in FIG. 2, determine, based on context 212 of simulated user input 210, whether data transmission 214 that is an expected result of user input 210 to computer program 208. The term "expected," as used herein, generally refers to the data transmission being consistent with the purpose of the computer program and appropriate to the user input, as indicated by the context of user interface elements receiving the user input.

Context module 108 may determine whether the transmission of sensitive data is an expected result of the user input in a variety of ways. For example, context module 108 may identify, based on the context of the simulated user input, whether the transmission of sensitive data is an expected result of the user input by (1) determining an expected transmission associated with the purpose for the user interface element and (2) determining whether the transmission of sensitive data includes the expected transmission. For example, as depicted in FIG. 4, window title 404 indicates that the purpose of the computer program is to synchronize data on the computing device with a cloud database. Secondary controls 414 and help text 416, as well as the "Login" label on primary control 412 indicate that the purpose of primary control is to log into the cloud database service and that it may be expected that when primary control 412 is activated, the computer program will transmit a user name and password to the cloud database service. Control label 410 indicates that the button associated with control label 410 initiates the synchronization process. Control group title 406 indicates that the controls included in the control group are the types of data to be synchronized with the cloud database, and that when the "Synchronize" button associated with control label 410 is activated, the computer program may be expected to transmit data of the types selected in the control group.

Conversely, context module 108 may determine that a game program may not be expected to transmit contact information as part of the operation of the computer program, and that if transmission identification module 110 detects contact information sent during the program initiation period or during an input latency period, the data transmission may represent an unexpected leak of sensitive data. Context module 108 may determine that a game program that transmits a user name and password when the user clicks a button labeled "Login" is transmitting data consistent with expectations set by the computer program's user interface, but that transmission of a social security number in response to a user clicking a button labeled "Play" is not a transmission consistent with expectations set by the context of the input.

At step 312 one or more of the systems described herein may perform a security action with respect to the computer program based on whether the transmission of sensitive data is expected. For example, at step 312 security module 112 may, as part of computing device 202 in FIG. 2, perform security action 216 with respect to computer program 208 based on whether data transmission 215 that includes sensitive data is expected.

Security module 112 may perform a variety of security actions. For example, security module 112 may perform a security action with respect to the computer program by (1) formulating a rule associating the user input with the transmission of sensitive data, (2) creating a warning message stating that the computer program transmits sensitive data that is not the expected result of user input, and/or (3) identifying the computer program as malware.

A rule associating the user input with the transmission of sensitive data may take the form of a list of sensitive data items that may be transmitted in response to user input to various elements of the computer program's user interface. In some examples, security module 112 may provide the rule to a data loss prevention client. For example, at step 312 of FIG. 3, security module 112 may provide rule 218 to a data loss prevention client or may store rule 218 in database 120 for use by a data loss prevention client. As used herein, the term "data loss prevention client" may refer to a module configured to prevent sensitive information from leaking (e.g., being transmitted outside the bounds of the system under uncontrolled circumstances). Additionally or alternatively, a data loss prevention system may be configured to prevent sensitive information from being misused and/or insecurely stored. Embodiments of the instant disclosure may be implemented as part of a data loss prevention system.

In other examples, security module 112 may create a warning message that may be displayed to the user when the computer program is installed, indicating the type of sensitive data the computer program may transmit. In another example, security module 112 may determine that the sensitive data transmitted by the computer program is inconsistent with the purpose of the computer program and/or inconsistent with elements of the computer program's user interface, as indicated by the context of the data elements. In such cases, security module 112 may determine that the computer program may be considered malware. Security module 112 may report the computer program to an anti-malware system.

As explained above, the systems and methods described herein may determine whether transmission of sensitive data is expected by examining the context of elements of the computer program's user interface to determine what sensitive data, if any, may be expected to be transmitted in response to user input. When systems and methods described herein simulate user input to the computer program systems and methods described herein may then determine whether sensitive data actually transmitted by the computer program is consistent with expectations set by the computer program's user interface. Systems and methods described herein may separate data transmitted during a program initiation period and interface latency periods to properly differentiate data transmissions made during program initiation that are not associated with user input and data transmissions associated with individual inputs to user interface elements. By analyzing the context of user interface elements and data transmissions, systems and methods described herein may determine whether the data transmissions are expected or unexpected.

Figure 5:
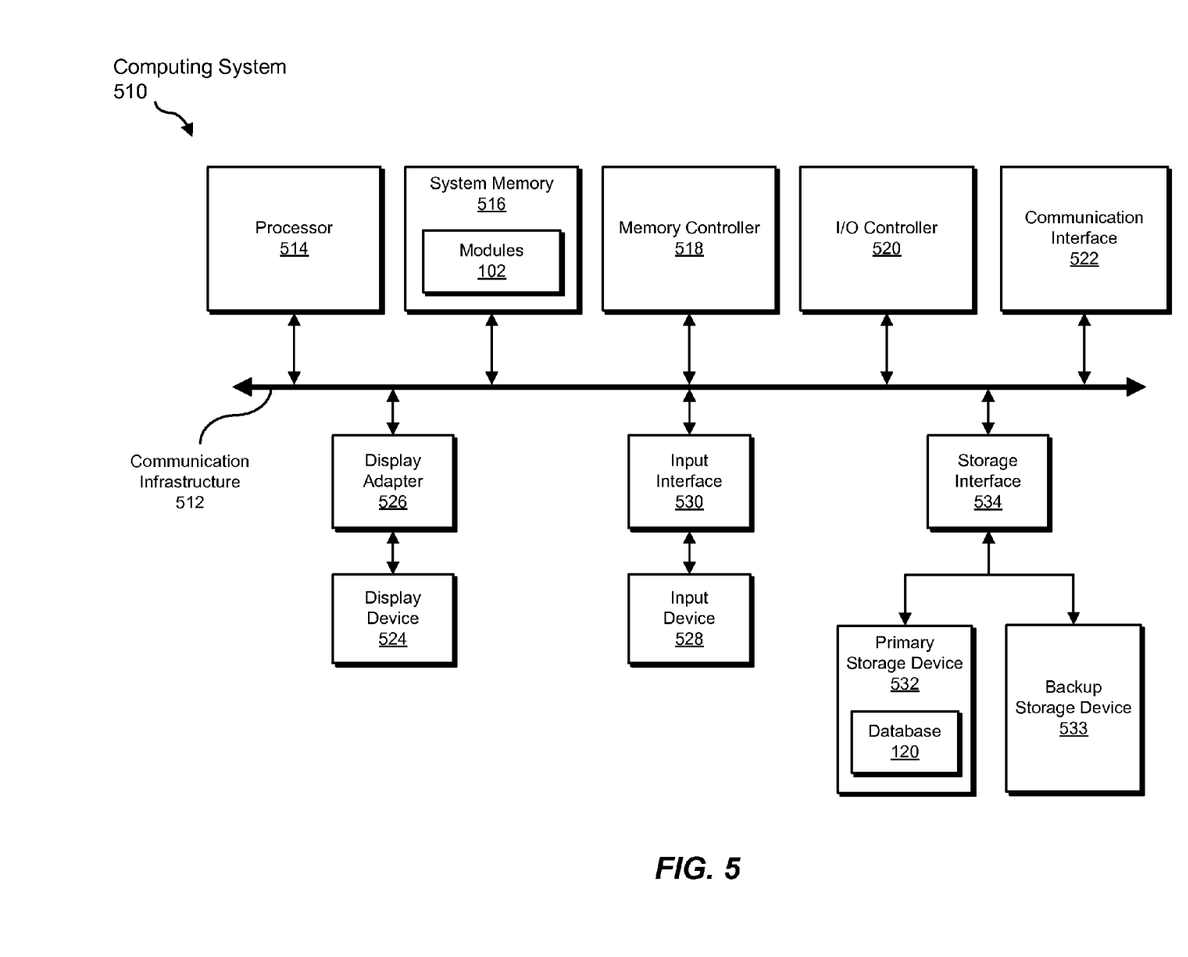
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530.

Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
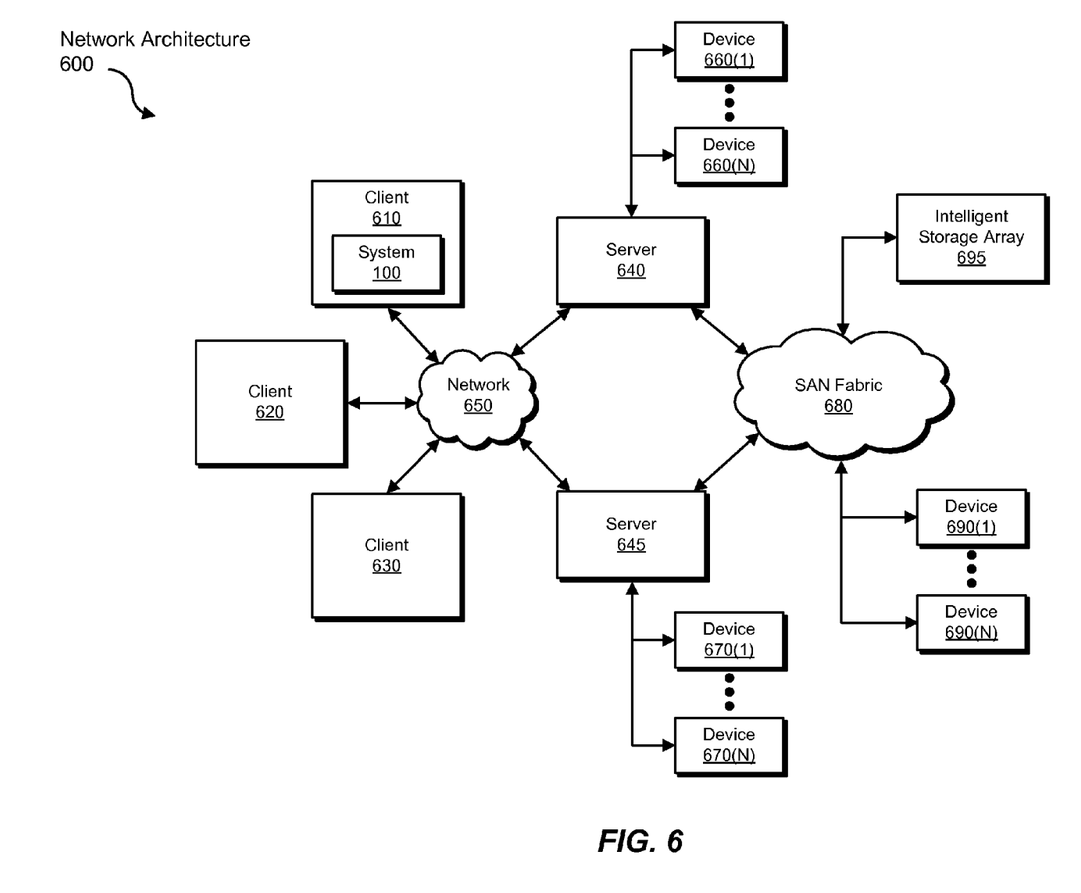
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for determining whether transmission of sensitive data is expected.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive software program data to be transformed, transform the data, use the result of the transformation to determine whether transmission of sensitive data is expected, and store the transformed data as a rule associating user input with the transmission of sensitive data. Additionally or alternatively, one or more of the modules recited herein may transform a computing system into a system for determining whether transmission of sensitive data is expected. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining whether transmission of sensitive data is expected, the method being performed by a computing device comprising at least one hardware processor, the method comprising:

identifying a computer program that is to be analyzed to determine whether the computer program unexpectedly transmits sensitive data;

determine whether data transmitted by the computer program is consistent with expectations set by a user interface of the computer program by:

while the computer program is executing, simulating user input to the computer program by:

identifying a user interface element of the computer program;

identifying a user input action appropriate for the user interface element of the computer program;

identifying an event that results from the user input action in a computing platform on which the computer program is executing;

providing the user input action to the user interface element of the computer program;

identifying a context of the simulated user input;

identifying transmission of sensitive data that occurs after the user input is simulated;

determining, based on the context of the simulated user input, whether the transmission of sensitive data is an expected result of the user input;

performing a security action with respect to the computer program based on whether the transmission of sensitive data is expected.

2. The computer-implemented method of claim 1, wherein simulating user input to the computer program further comprises:

initiating the event in the computing platform directed toward the user interface element of the computer program.

3. The computer-implemented method of claim 2, wherein identifying the context of the simulated user input comprises identifying information associated with the user interface element that indicates a purpose for the user interface element, wherein the information comprises at least one of:

a label on the user interface element;
   a label proximate to the user interface element;
   a label on a user interface element group that includes the user interface element;
   a label on a window displayed by the computer program;
   help text associated with the user interface element;
   at least one additional user interface element displayed by the computer program after user input to the user interface element is simulated.

4. The computer-implemented method of claim 3, wherein determining, based on the context of the simulated user input, whether the transmission of sensitive data would be an expected result of the user input comprises:

determining an expected transmission associated with the purpose for the user interface element;
   determining whether the transmission of sensitive data includes the expected transmission.

5. The computer-implemented method of claim 1, wherein identifying transmission of sensitive data that occurs after the user input is simulated comprises:

identifying an input latency period that represents a maximum expected time between the user input and an associated data transmission;
   determining whether the transmission of sensitive data occurs within the input latency period, wherein the determination of whether the transmission of sensitive data is an expected result of the user input is based on whether the transmission of sensitive data occurs within the input latency period.

6. The computer-implemented method of claim 1, further comprising identifying transmission of sensitive data that occurs before the user input is simulated by:

identifying a program initiation period that represents a maximum expected time for the computer program to perform initiation functions after the computer program begins executing;

executing the computer program;

identifying the transmission of sensitive data within the program initiation period, wherein the security action is further based on identifying the transmission of sensitive data within the program initiation period.

7. The computer-implemented method of claim 1, wherein the security action comprises at least one of:

formulating a rule associating the user input with the transmission of sensitive data;

creating a warning message stating that the computer program transmits sensitive data that is not an expected result of user input;

identifying the computer program as malware.

8. The computer-implemented method of claim 7, further comprising providing the rule to a data loss prevention client.

9. A system for determining whether transmission of sensitive data is expected, the system comprising:

a program identification module, stored in memory, that identifies a computer program that is to be analyzed to determine whether the computer program unexpectedly transmits sensitive data;

a simulation module, stored in memory, that simulates user input to the computer program while the computer program is executing by:

identifying a user interface element of the computer program;

identifying a user input action appropriate for the user interface element of the computer program;

identifying an event that results from the user input action in a computing platform on which the computer program is executing;

providing the user input action to the user interface element of the computer program;

a context module, stored in memory, that identifies a context of the simulated user input;

a transmission identification module, stored in memory, that identifies transmission of sensitive data that occurs after the user input is simulated, wherein the context module determines, based on the context of the simulated user input, whether data transmitted by the computer program is consistent with expectations set by a user interface of the computer program by determining whether the transmission of sensitive data is an expected result of the user input;

a security module, stored in memory, that performs a security action with respect to the computer program based on whether the transmission of sensitive data is expected;

at least one physical processor configured to execute the program identification module, the simulation module, the context module, the transmission identification module, and the security module.

10. The system of claim 9, wherein the simulation module further simulates user input to the computer program by:

initiating the event in the computing platform directed toward the user interface element of the computer program.

11. The system of claim 10, wherein the context identifies the context of the simulated user input by identifying information associated with the user interface element that indicates a purpose for the user interface element, wherein the information comprises at least one of:

a label on the user interface element;

a label proximate to the user interface element;

a label on a user interface element group that includes the user interface element;

a label on a window displayed by the computer program;

help text associated with the user interface element;

at least one additional user interface element displayed by the computer program after user input to the user interface element is simulated.

12. The system of claim 11, wherein the context module determines, based on the context of the simulated user input, whether the transmission of sensitive data is an expected result of the user input by:

determining an expected transmission associated with the purpose for the user interface element;

determining whether the transmission of sensitive data includes the expected transmission.

13. The system of claim 9, wherein the transmission identification module identifies transmission of sensitive data that occurs after the user input is simulated by:

identifying an input latency period that represents a maximum expected time between the user input and an associated data transmission;

determining whether the transmission of sensitive data occurs within the input latency period, wherein the determination of whether the transmission of sensitive data would be an expected result of the user input is based on whether the transmission of sensitive data occurs within the input latency period.

14. The system of claim 9, wherein the transmission identification module identifies transmission of sensitive data that occurs before the user input is simulated by:

identifying a program initiation period that represents a maximum expected time for the computer program to perform initiation functions after the computer program begins executing;

executing the computer program;

identifying the transmission of sensitive data within the program initiation period, wherein the security action is further based on identifying the transmission of sensitive data within the program initiation period.

15. The system of claim 9, wherein the security action performed by the security module is at least one of:

formulating a rule associating the user input with the transmission of sensitive data;

creating a warning message stating that the computer program transmits sensitive data that is not an expected result of user input;

identifying the computer program as malware.

16. The system of claim 15, wherein the security module provides the rule to a data loss prevention client.

17. A non-transitory computer-readable medium comprising one or more computer-readable instructions that, when executed by at least one hardware processor of a computing device, cause the computing device to:

identify a computer program that is to be analyzed to determine whether the computer program unexpectedly transmits sensitive data;

determine whether data transmitted by the computer program is consistent with expectations set by a user interface of the computer program by:

while the computer program is executing, simulating user input to the computer program by:

identifying a user interface element of the computer program;

identifying a user input action appropriate for the user interface element of the computer program;

identifying an event that results from the user input action in a computing platform on which the computer program is running;

providing the user input action to the user interface element of the computer program;

identifying a context of the simulated user input;

identifying transmission of sensitive data that occurs after the user input is simulated;

determining, based on the context of the simulated user input, whether the transmission of sensitive data is an expected result of the user input;

perform a security action with respect to the computer program based on whether the transmission of sensitive data is expected.

18. The non-transitory computer-readable medium of claim 17, wherein the one or more computer-readable instructions further cause the computing device to simulate user input to the computer program by:

initiating the event in the computing platform directed toward the user interface element of the computer program.

19. The non-transitory computer-readable medium of claim 18, wherein:

the one or more computer-readable instructions cause the computing device to identify the context of the simulated user input by identifying information associated with the user interface element that indicates a purpose for the user interface element;

the information comprises at least one of:
a label on the user interface element;
a label proximate to the user interface element;
a label on a user interface element group that includes the user interface element;
a label on a window displayed by the computer program;
help text associated with the user interface element;
at least one additional user interface element displayed by the computer program after user input to the user interface element is simulated.

20. The non-transitory computer-readable medium of claim 19, wherein the one or more computer-readable instructions cause the computing device to determine, based on the context of the simulated user input, whether the transmission of sensitive data is an expected result of the user input by:

determining an expected transmission associated with the purpose for the user interface element;

determining whether the transmission of sensitive data includes the expected transmission.

* * * * *